United States Patent
Polley et al.

(10) Patent No.: US 10,244,406 B2
(45) Date of Patent: Mar. 26, 2019

(54) WIRELESS SENSOR INFORMATION MONITORING

(71) Applicant: Lonza Ltd., Basel (CH)

(72) Inventors: Rex Polley, Exeter, NH (US); Michael Goetter, Mount Laurel, NJ (US)

(73) Assignee: Lonza Ltd., Basel (CH)

(*) Notice: Subject to any disclaimer, the term of this patent is extended or adjusted under 35 U.S.C. 154(b) by 0 days.

(21) Appl. No.: 15/452,393

(22) Filed: Mar. 7, 2017

(65) Prior Publication Data

US 2018/0262916 A1    Sep. 13, 2018

(51) Int. Cl.
| | |
|---|---|
| *H04W 16/20* | (2009.01) |
| *H04W 4/70* | (2018.01) |
| *H01Q 21/28* | (2006.01) |
| *H04W 4/00* | (2018.01) |
| *H04W 84/18* | (2009.01) |

(52) U.S. Cl.
CPC ............ *H04W 16/20* (2013.01); *H01Q 21/28* (2013.01); *H04W 4/70* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 5,656,491 A | 8/1997 | Cassani et al. | |
| 6,831,921 B2* | 12/2004 | Higgins | H04L 12/2856 370/401 |
| 7,629,167 B2 | 12/2009 | Hodge et al. | |
| 8,298,054 B2 | 10/2012 | Hodge et al. | |
| 9,609,617 B2* | 3/2017 | Arslan | G01S 5/0242 |
| 9,814,063 B2* | 11/2017 | Chakrabarti | H04W 72/1268 |
| 9,848,345 B1* | 12/2017 | Baroudi | H04W 24/04 |
| 2002/0188287 A1* | 12/2002 | Zvuloni | A61B 18/02 606/21 |
| 2006/0046642 A1* | 3/2006 | Bassiri | H04B 7/15535 455/7 |
| 2009/0305626 A1 | 12/2009 | Hope | |
| 2010/0177750 A1* | 7/2010 | Essinger | H04L 67/12 370/338 |

(Continued)

OTHER PUBLICATIONS

International Search Report (PCT/ISA/210) issued in PCT Application No. PCT/US18/19332 dated Mar. 23, 2018 (four (4) pages).

(Continued)

*Primary Examiner* — Eunsook Choi
(74) *Attorney, Agent, or Firm* — Crowell & Moring LLP

(57) ABSTRACT

The disclosure is directed to a system, apparatus, and method for continuously monitoring data output from a wireless sensor on a mesh network at a frequency higher than mesh formation/propagation. For example, the system may include a wireless gateway, an amplifier coupled to the wireless gateway, a first antenna coupled to the amplifier, a second antenna coupled to the amplifier, and a wireless sensor. The wireless sensor may be a wireless temperature sensor configured to monitor the temperature of a cryopreserved material product. The wireless gateway forms the mesh network. The first antenna may be located on a first level of a building, and the second antenna may be located on a second level of the building, where the second level may be at an elevation higher than the first level.

22 Claims, 4 Drawing Sheets

(56) References Cited

U.S. PATENT DOCUMENTS

| | | |
|---|---|---|
| 2011/0280797 A1 | 11/2011 | Mohtadi et al. |
| 2012/0068822 A1* | 3/2012 | Sheikman ................. G01S 5/00 340/7.2 |
| 2012/0077429 A1 | 3/2012 | Wernimont et al. |
| 2012/0188057 A1* | 7/2012 | Green ..................... H04L 67/12 340/8.1 |
| 2012/0258758 A1* | 10/2012 | Overduin ............... H04B 1/401 455/518 |
| 2013/0280797 A1 | 10/2013 | Rao et al. |
| 2016/0097074 A1 | 4/2016 | Collins et al. |
| 2016/0205078 A1* | 7/2016 | James ................. H04L 63/0442 713/171 |
| 2017/0230916 A1* | 8/2017 | Stein .................... H04W 52/34 |

OTHER PUBLICATIONS

Written Opinion (PCT/ISA/237) issued in PCT Application No. PCT/US18/19332 dated Mar. 23, 2018 (six (6) pages).

\* cited by examiner

400

WIRELESS SENSOR INFORMATION MONITORING

BACKGROUND ART

The invention relates to a system, apparatus, and method for monitoring data output from a wireless sensor at predefined time intervals on an existing network without the reporting delays that can come from communicating via a mesh network.

Typically, a wireless network may include a wireless gateway and numerous nodes, such as repeater instruments, connected to the wireless gateway. The wireless network may also include various network components, such as computing devices and wireless sensors, connected to each of the nodes.

A mesh network is a network topology in which each node can relay data for each other in the network. For example, if a network component loses direct contact with the wireless gateway, the network component may send the data to a first node of the mesh network, which can relay the data to a second node that can directly reach the wireless gateway. In that regard, the first node "passes along" or "hands off" the data to the second node of mesh network, which could then send the data to the wireless gateway.

Different techniques to relay or pass along data from one node to another node may be employed on mesh networks, such as "flooding" or "routing" techniques. With routing, data may be propagated along a particular network path by hopping from node to node until the data reaches its destination. Whereas, flooding refers to the controlled or uncontrolled sending of incoming data through every downstream link or connection, thus ensuring that the data reaches its destination.

However, the above-described routing and flooding techniques, as well as the overall functionality of a mesh topology, render it extremely difficult to monitor and/or obtain data output from a wireless sensor at short time intervals when direct connection between the sensor and the wireless gateway is lost. One reason for this difficulty is that it may take a long period of time to establish, relay, propagate, or pass along data between multiple nodes of the mesh network back to the gateway, especially if the mesh network is large and complex.

SUMMARY OF THE INVENTION

In accordance with one or more aspects of the disclosure, the invention is directed to a system, apparatus, and method for monitoring data output from a wireless sensor at predefined time intervals on an existing mesh network. For example, one or more antennas may be connected to a wireless gateway of the mesh network. The one or more antennas may be strategically placed, such as in a building, a plant or facility, so that the connection between the wireless gateway and the wireless sensor is maintained as the wireless sensor moves from one location to another. Thus the connection between the sensor and gateway is not lost, and the various nodes of the mesh network do not have to be relied upon, nor take the time to establish and to pass along the data from the sensor to the wireless gateway.

Accordingly, the placement of the one or more antennas allow for direct and continuous connection between the wireless sensor and the wireless so that data output from the sensor can be monitored at much shorter time intervals.

DETAILED DESCRIPTION OF EMBODIMENTS OF THE INVENTION

Figure 1:
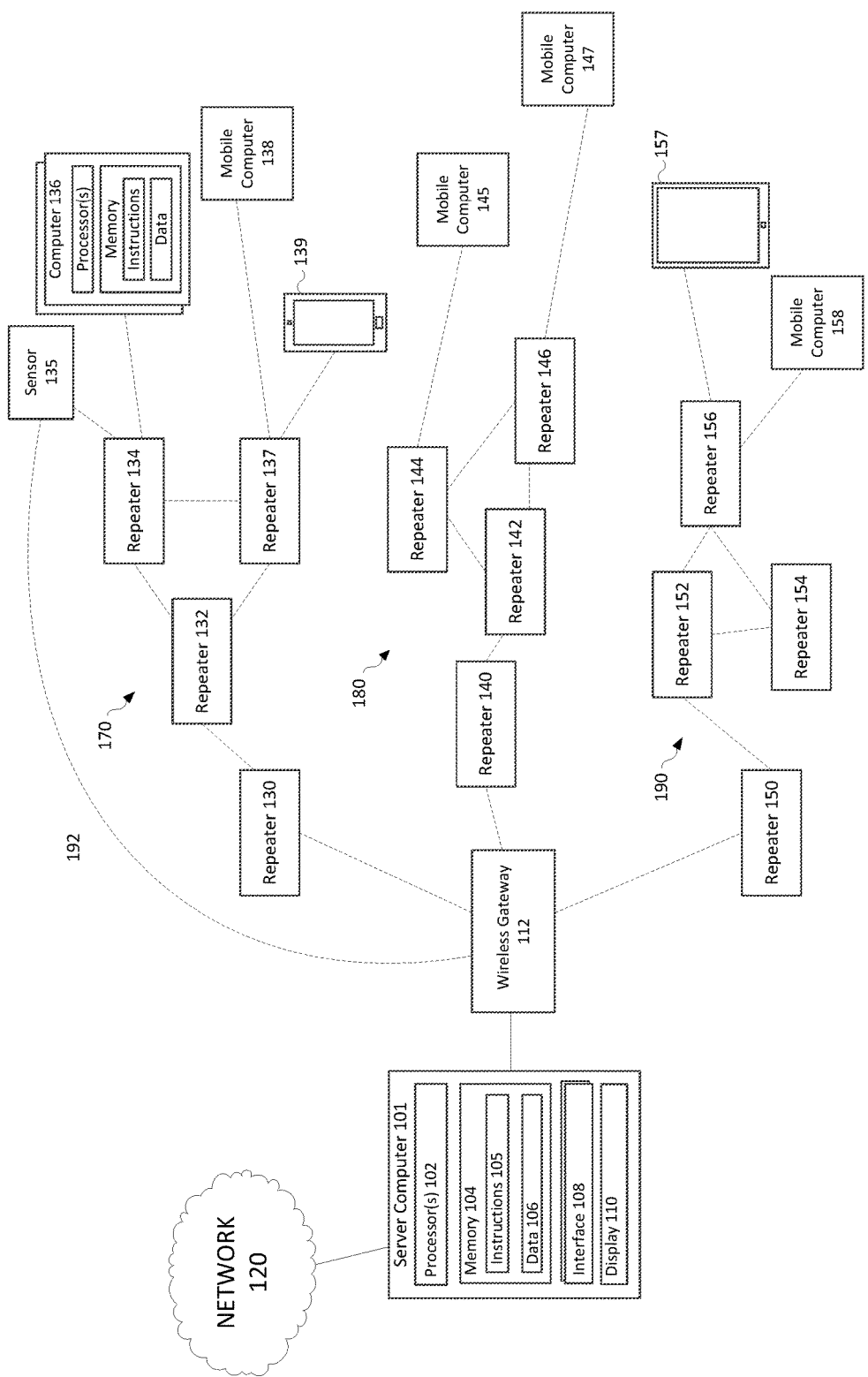
FIG. 1 illustrates a system in accordance with one or more aspects of the invention.

The invention relates to a system, apparatus, and method for monitoring data output from a wireless sensor at predefined time intervals on an existing mesh network. The mesh network may be configured to connect a wireless gateway to various network components, such as within a building, a plant or facility for producing biologics. For example, the wireless systems described herein can be used in any situation requiring monitoring of portable or wireless sensors such as particle, humidity, temperature, or other sensors, to achieve monitoring intervals of less than about 10 seconds. By way of non-limiting example, the systems described herein can be employed in pharmaceutical, nutraceutical, biologic, and biopharmaceutical manufacturing, medical device manufacturing, consumer and electronics manufacturing such as semiconductor manufacturing, automotive manufacturing, or any other setting requiring the interrogation and/or monitoring of data from a wireless sensor.

For example, in some aspects such as in clean room settings including grade A or B clean rooms it can be important to know exactly if and when airborne particles exceed acceptable limits. Such a clean room particle monitoring application could be applicable in almost any pharmaceutical production done in a clean room (including injectables, bio therapeutics, and others) as it would aid the investigation of root cause for contamination when contaminants are detected. In some such settings, for example, the systems described herein can be utilized when portable sensors are used in a system that also contains fixed point sensors within the clean room. In such systems, the fixed point sensors can be wired to the data collection point and thus achieve improved response and interrogation. As such, in order to obtain data from the portable, wireless sensors in the system, it can be advantageous to employ the systems described herein in order to ensure the portable, wireless sensors achieve similarly fast response times relative to the fixed point sensors.

In other aspects, for example, the wireless sensor may be a wireless temperature sensor that measures the temperature of a cryopreserved material moving from one location in the building to another location, such as from one room to another for further processing. In order to maintain and regulate the chemical kinetics of the cryopreserved material, the temperature of the material can be measured, reported, and/or monitored at predefined time intervals, which may be, for instance, every 16 seconds, every minute, a minimum of every five minutes, etc.

When the wireless temperature sensor loses direct connection with the wireless gateway while the cryopreserved material is being transported from one part of the building to another, such as in an elevator, the time to route temperature data from the sensor to the wireless gateway using nodes of the existing mesh network may be greater than the above predefined time intervals. As such, it is advantageous to maintain the direct and continuous connection between the wireless temperature sensor and the wireless gateway so as to, for example, ensure no metabolic activity occurs due to unintended thawing in the cryopreserved material and thus ensuring drug efficacy.

In one aspect of the disclosure, one or more antennas may be connected to the wireless gateway via one or more splitters. As will be further described below, the one or more antennas may be strategically placed so that direct and continuous connection between the wireless temperature sensor and the wireless gateway can be maintained, including within a building. The one or more antennas, for instance, may be placed near places in the building where signal is likely to be lost, such as in an elevator moving up or down in an elevator shaft. A variable amplifier may be connected between the one or more splitters and the wireless gateway in order to amplify the signals that are received at the one or more antennas. As such, the system, apparatus, and/or method described in the present disclosure allow for faster response and reporting times from the wireless sensors compared to the response and reporting times from node-to-node handoffs in the existing mesh network.

FIG. 1 illustrates an example system in accordance with one or more aspects of the invention. The system may be a mesh network 100 that exists in a building, such as a plant or facility for producing biologics. The wireless mesh network 100 may include a wireless gateway 112, repeaters 130, 132, 134, 137, 140, 142, 144, 146, 150, 152, 154, 156, sensor 135, and one or more computing devices (e.g., server computer 101, computer 136, mobile computers 138, 145, 147, 158, smartphone 139, tablet computer 157).

As shown in FIG. 1, the server computer 101 is connected to a network 120 and the wireless gateway 112. The wireless gateway 112 is connected to at least there different sub-mesh arrangements: sub-mesh arrangement 170, sub-mesh arrangement 180, and sub-mesh arrangement 190, all of which form the overall mesh network 100. Sub-mesh arrangement 170 is formed by the interconnection of repeaters 130, 132, 134, and 137. Similarly, sub-mesh arrangement 180 is formed by the interconnection of repeaters 140, 142, 144, and 146. And sub-mesh arrangement 180 is formed by the interconnection of repeaters 150, 152, 154, and 156. It may be understood that the various connections shown in FIG. 1 may be wired and/or wireless.

The server computer 101 includes one or more processors 102, memory 104, e.g., permanent or flash memory (which includes instructions 105 and data 106), one or more interfaces 108, and a display 110. The processor 102 instructs the various components of server computer 101 to perform tasks based on the processing of certain information, such as instructions 105 and/or data 106 stored in the memory 104, and the processor 102 may be any standard processor, such as a central processing unit (CPU), or may be a dedicated processor, such as an application-specific integrated circuit (ASIC) or a field programmable gate array (FPGA) or an industrial process controller. Memory 104, whether permanent or flash, may be any type of hardware (e.g., ROM, RAM, CD-ROM, hard drive, write-capable, read-only, etc.) configured to store information accessible by the processor 102, such as instructions 105 and data 106, which can be executed, retrieved, manipulated, and/or stored by the processor 102. The instructions 105 stored in memory 104 may include any set of instructions (e.g., "steps" or "algorithm" associated with software) that can be executed directly or indirectly by the processor 102. The data 106 stored in memory 104 may be retrieved, stored or modified by the processor 102, for example, in accordance with the instructions 105. Interface 108 may be a particular device for interfacing with the server computer 101 (e.g., a field-mounted instrument, processor-to-processor communication, keyboard, mouse, touch sensitive screen, camera, microphone, etc.), a connection or port (e.g., data port, USB, zip drive, card reader, CD driver, DVD drive, etc.), and/or software (e.g., graphical user interface) that allows the reception of information and data. The display 110 may be any suitable type of device capable of communicating data to a user, such as liquid-crystal display (LCD), light emitting diode (LED), and plasma screens.

The wireless gateway 112 may be configured to route data packets from a wireless local area network to another network, such as a wired or wireless wide area network. It may be implemented as hardware or software, or a combination of both. For example, the wireless gateway 112 may combine the functions of a wireless access point, a repeater, and provide firewall functions, and protect the mesh network 100 using encryption techniques, such as Wi-Fi Protected Access (WPA), and Wi-Fi Protected Setup (WPS). The wireless gateway may run on a 900 MHz spectrum and/or a 2.4 GHz spectrum and it may also be configured to support various wireless standards, such as 802.11b and 802.11g with speeds up to 56 Mbit/s, 802.11n with speeds up to 300 Mps, 802.11ac with speeds up to 1200 Mbit/s, and may also include a local area network interface that can support 100 Mbit/s or 1000 Mbit/s (Gigabit) Ethernets. While FIG. 1 shows the wireless gateway 112 separately connected to the server computer 101, it may be understood that the wireless gateway 112 and server computer 101 (or any computing device) is implementable in a single housing or as a single component.

The repeaters 130, 132, 134, 137, 140, 142, 144, 146, 150, 152, 154, 156 may be networking devices configured to forward data packets between the various components of the network 100. As such, the repeaters may be considered the nodes of the mesh network 100. Data, for instance, may be sent from mobile computer 138 to the wireless gateway 112 using repeaters 137, 132, 130 in that order. Moreover, the repeaters may also be configured to perform data traffic direction functions on the network, based on, for example, routing tables or routing policies. Although FIG. 1 illustrates the repeaters as being the nodes of the mesh network 100, the nodes may be any network device that is capable of receiving and transmitting information, signals and/or data.

Sensor 135 may be a device that can detect any event or change in a particular environment, output information, and sends the information to a networking device or computing device. In at least that regard, the sensor 135 can convert real world data, which is analog, into data, such as digital data, that a computer or networking device can understand and process. As will be further discussed below, in one embodiment of the disclosure, the sensor 135 may be a wireless temperature sensor for sensing the temperature of a cryopreserved material that is moving from one location of a building to another location in the same building. It may be understood, however, that the sensor 135 may be any suitable type of sensor for monitoring the temperature, level, pressure, etc. and/or status of the cryopreserved material.

Similar to server computer 101, computer 136 may include at least one processor, memory which also includes instructions and data, one or more interfaces (not shown), and/or a display (not shown). The computer 136 may be a mobile computer similar to mobile computers 138, 145, 147, 158, or may be a smartphone similar to smartphone 139, or may be a tablet computer similar to tablet computer 157.

The mobile computers 138, 145, 147, and 158 may be a laptop (or any type of computer that is portable or mobile, such as an Ultrabook, smartphone, PDA, tablet computer, a wearable computing device, etc.) and also include components similar to the server computer 101 and/or computer 136. The mobile computers may also have one or more processors, memory, user interfaces, wired or wireless network connection hardware, and other types of components associated with a mobile computing device. Moreover, smartphone 139 may be a mobile cellular phone and tablet computer 157 may be a portable computer, both of which have various computing capabilities as well as network connectivity, and also may include one or more processors, memory, one or more user interfaces, such as a QWERTY keypad, a camera, image sensors, a global positioning system (GPS), accelerator, temperature sensors, etc.

The network 120 may be any suitable type of network, wired or wireless, configured to facilitate the transmission of data, instructions, etc. between one or more nodes or devices outside of the mesh network 100. For example, the network 120 may be a local area network (LAN) (e.g., Ethernet or other IEEE 802.03 LAN technologies), Wi-Fi (e.g., IEEE 802.11 standards), wide area network (WAN), virtual private network (VPN), global area network (GAN), or any combinations thereof.

When sensor 135 (or any other device illustrated in FIG. 1) loses direct connection (the direct connection depicted by connection 192) with the wireless gateway 112, it may connect to one or more nodes of the mesh network 100 depending on its location relative to the one or more nodes at the time of disconnect in order to communicate with the gateway. Thus, for instance, sensor 135 may connect to repeater 134 of sub-mesh arrangement 170, as illustrated in FIG. 1, to continue communicating with wireless gateway 112 despite the loss of direct connection 192 with the gateway. This may be performed by the sensor 135 sending data to repeater 134, which then passes along the received data to repeater 132 that subsequently passes along the data to repeater 130, which then passes along the data to wireless gateway 112. In at least that regard, the repeaters 130, 132, and 134 work together to sequentially hand off the data so that it eventually arrives at the wireless gateway 112.

As described above, the sensor 135 may be a wireless temperature sensor configured to output temperature readings of a cryopreserved material being transported within the building. In order to maintain and regulate the chemical kinetics of the cryopreserved material, the temperature of the material may be monitored at specific, predefined time intervals. For example, the predefined time intervals may be every 16 seconds, or any other suitable time interval less than every 5 minutes. Accordingly, in this example, the wireless gateway is required to receive temperature readings from the wireless temperature sensor, at minimum every 5 minutes (e.g., given the difference between ambient and cryopreservation temperatures), but preferably every 16 seconds. When the predefined reporting time interval is short, such as every 16 seconds, maintaining the direct and continuous connection 192 between the wireless sensor and the wireless gateway 112 in the building is important. Otherwise, the time it could take the repeaters 130, 132, 134 to recognize the loss of direct connection to the gateway, establish, and then employ the mesh network to pass along the temperature readings to the wireless gateway 112, which may exceed the 16 second time interval.

Figure 2:
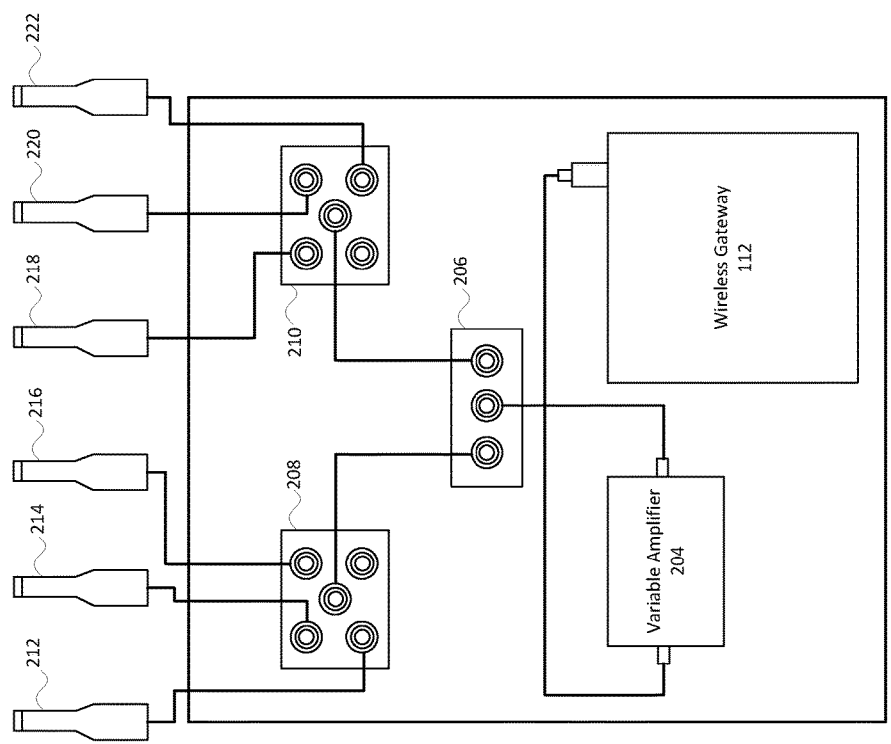
FIG. 2 illustrates an apparatus in accordance with one or more aspects of the invention.

FIG. 2 illustrates an apparatus 200 in accordance with one or more aspects of the invention configured to allow, for example, the wireless gateway 112 to maintain a direct and continuous connection 192 with the sensor 135. According to one aspect of the disclosure, the apparatus 200 may include the wireless gateway 112, a variable amplifier 204, splitters 206, 208, 210, and antennas 212, 214, 216, 218, 220, and 222.

As shown in FIG. 2, the wireless gateway 112 is connected to the variable amplifier 204, which may be a device for amplifying or "boosting" a signal that may be received by an antenna (e.g., at a minimum of 0.5 Watts). The variable amplifier 204 has at least one input that may directly or indirectly connect an antenna to the variable amplifier and also has at least one output that connects the variable amplifier to the wireless gateway 112, as illustrated. Moreover, the amplification of the variable amplifier 204 may be adjusted or varied based on desired setting(s).

The variable amplifier 204 is connected to splitter 206, which is a device that connects one signal path to two or more signal paths while being able to maintain proper impedance characteristics. For example, while the one signal path is already established between the splitter 206 and the variable amplifier 204, two additional signals paths are formed by the splitter 206: one signal path established between splitter 206 and splitter 208 and the other established between splitter 206 and splitter 210. Similar to splitter 206, splitters 208 and 210 each connects one signal path to four different signal paths, as shown in FIG. 2. Each of the antennas 212, 214, and 216 connects to one of the four signal paths of splitter 208, and likewise, each of the antennas 218, 220, and 22 connects to one of the four signal paths of splitter 210. It may be understood that coaxial cables with approximately equal lengths (and/or varying lengths) may be used to connect the antennas to the splitters 208 and 210.

As will be further discussed below with respect to FIG. 3, the antennas 212, 214, 216, 218, 220, and 222 may be placed in different locations within the above-described building so as to not lose direct and continuous connection between the moving sensor 135 and the wireless gateway 112 so as to, for example, avoid the formation and use of the meshing aspects of the mesh network. Accordingly, when sensor 135, for instance, is closest to antenna 216 relative to the other antennas, antenna 216 will receive one or more signals from the sensor 135 with the data output from the sensor, such as temperature readings of the cryopreserved material, and transmit the signals to splitter 208, when then goes to splitter 206, then to the variable amplifier 204 for signal amplification, and then goes to wireless gateway 112. Similar scenarios apply to antennas 212, 214, 218, 220, 222, when the sensor 135 is closest to antennas 212, 214, 218, 220, 222, respectively. It may also be understood that more than one antenna can receive and send signals from the sensor 135 to the wireless gateway 112.

Figure 3:
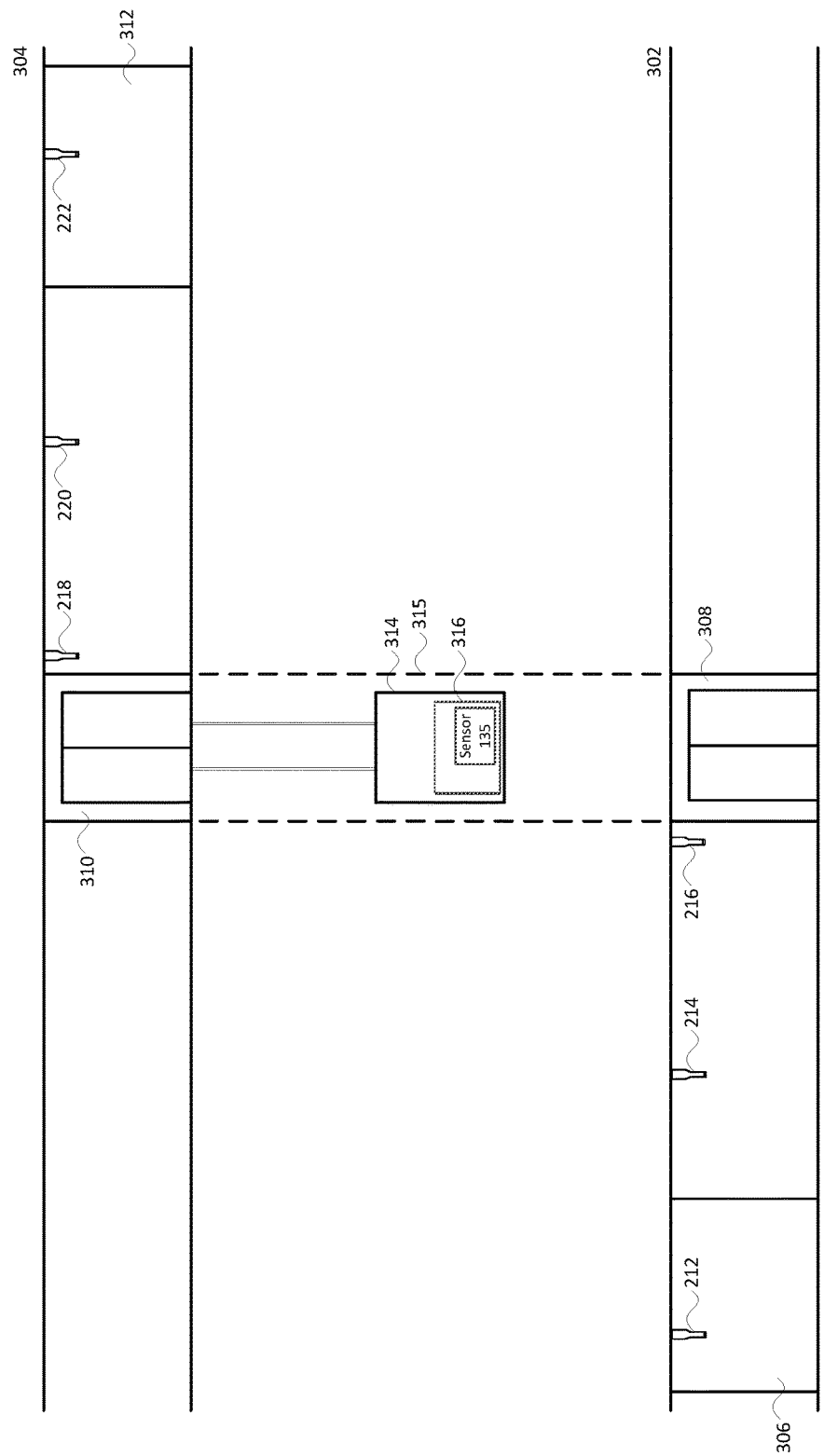
FIG. 3 illustrates a multi-elevation side view of a building in accordance with one or more aspects of the invention.

FIG. 3 illustrates a multi-elevation side view of a portion of a building 300, such as a facility or factory, in accordance with one or more aspects of the invention. The building 300 includes floors 302 and 304, rooms 306 and 312, elevator lobbies 308 and 310, elevator 314, and elevator shaft 315.

As shown, floor 304 of the building 300 may be the floor directly above floor 302. For instance, floor 304 may be the second floor and floor 302 may be the first floor. In one example scenario, a cryopreserved material product may need to be transported from room 306 on floor 302 to room 312 on floor 304. A moving system 316 for moving the cryopreserved material product may use liquid nitrogen to maintain and regulate the temperature of the cryopreserved material product, which in some instances, may disallow employees or persons from being in confined spaces, such as the elevator 314, with the moving system 316. Moreover, in order to monitor the temperature of the cryopreserved material product, the above-described sensor 135 may be implemented in the moving system 316 and configured to output temperature readings of the product over the course of transportation from room 306 to room 312.

Because the sensor 135 may lose direct and continuous contact with the wireless gateway 112 (not shown) while the moving system 316 is being transported in the elevator 314, the antennas 212, 214, 216, 218, 220, and 222 of the apparatus 200 may be strategically placed throughout the building 300 so as to maintain the direct and continuous connection between the sensor 135 and the wireless gateway 112.

In one example of the disclosure, three antennas may be placed on floor 302 and the three other antennas may be place on floor 304. Antennas 212 and 222 may be placed directly in the rooms 306 and 312, respectively, to at least ensure that the temperature of the cryopreserved material product can be monitored at every 16 seconds, for example, at the beginning and end of transportation from room 306 to 312. Moreover, antennas 216 and 218 may be located at, or near, the elevator lobbies 308 and 310 to at least ensure that the direct connection 192 (as shown in FIG. 1) between the sensor 135 and the wireless gateway 112 is maintained and to monitor temperature at every 16 seconds while the moving system 316 and the sensor are transported up and down the elevator shaft 315 in the elevator 314. Antenna 214 may be located approximately at the midpoint between room 306 and elevator lobby 308, and similarly antenna 220 may be located approximately at the midpoint between elevator lobby 310 and room 312, such that the connection between the sensor 135 and the wireless gateway 112 can be maintained and the temperature of the material product monitored at every 16 seconds, in both instances, while the moving system 316 is being transported up and down the hallways of the floors 302 and 304, respectively.

The server computer 101 connected to the wireless gateway 112 may determine, in one embodiment, whether the temperature readings from the sensor 135 are being properly reported to the wireless gateway at the predefined reporting time intervals, e.g., every 16 seconds. If not, the server computer 101, or any other suitable control system similar to the server computer 101 that may be connected to the wireless gateway 112, may visually and/or audibly warn an operator or employee monitoring the temperature of the cryopreserved material product of non-compliance.

Although FIG. 3 illustrates a building with two floors and one elevator, it may be understood that the building may have additional floors expanding multiple elevation levels, more than two elevators, and more than two hallways as well as turns for the moving system 316 to traverse in the building. In at least that regard, the placement of the antennas may change with the varying topology of the building. Moreover, because the antennas are separated by varying distances, coaxial cables with lengths corresponding to those distances may be used to connect the antennas to their respective splitters of the apparatus 200.

The present invention is advantageous in various ways. In one example, the direct, continuous connection between a wireless sensor and a wireless gateway can be maintained without altering or reconfiguring the overall architecture and topology of an existing mesh network. In another example, the present invention is advantageous because it allows the temperature of cryopreserved material products to be continually monitored at predefined, short time intervals so as to maintain and regulate the chemical kinetics of the material product. In addition, the configuration of at least the system and apparatus of the present invention is simple, cost-effective, and space efficient, without the need for significant additions to or modifications to the routing protocol of the existing mesh network.

While the present invention has been described in the context of monitoring material product temperature within a facility or plant, it may be understood that the system, apparatus, and/or methods described herein can also apply to any suitable wireless or wired network (in or outside of a building) that may include various nodes and various devices connected to those nodes, such as the food transportation industry, and the like.

Figure 4:
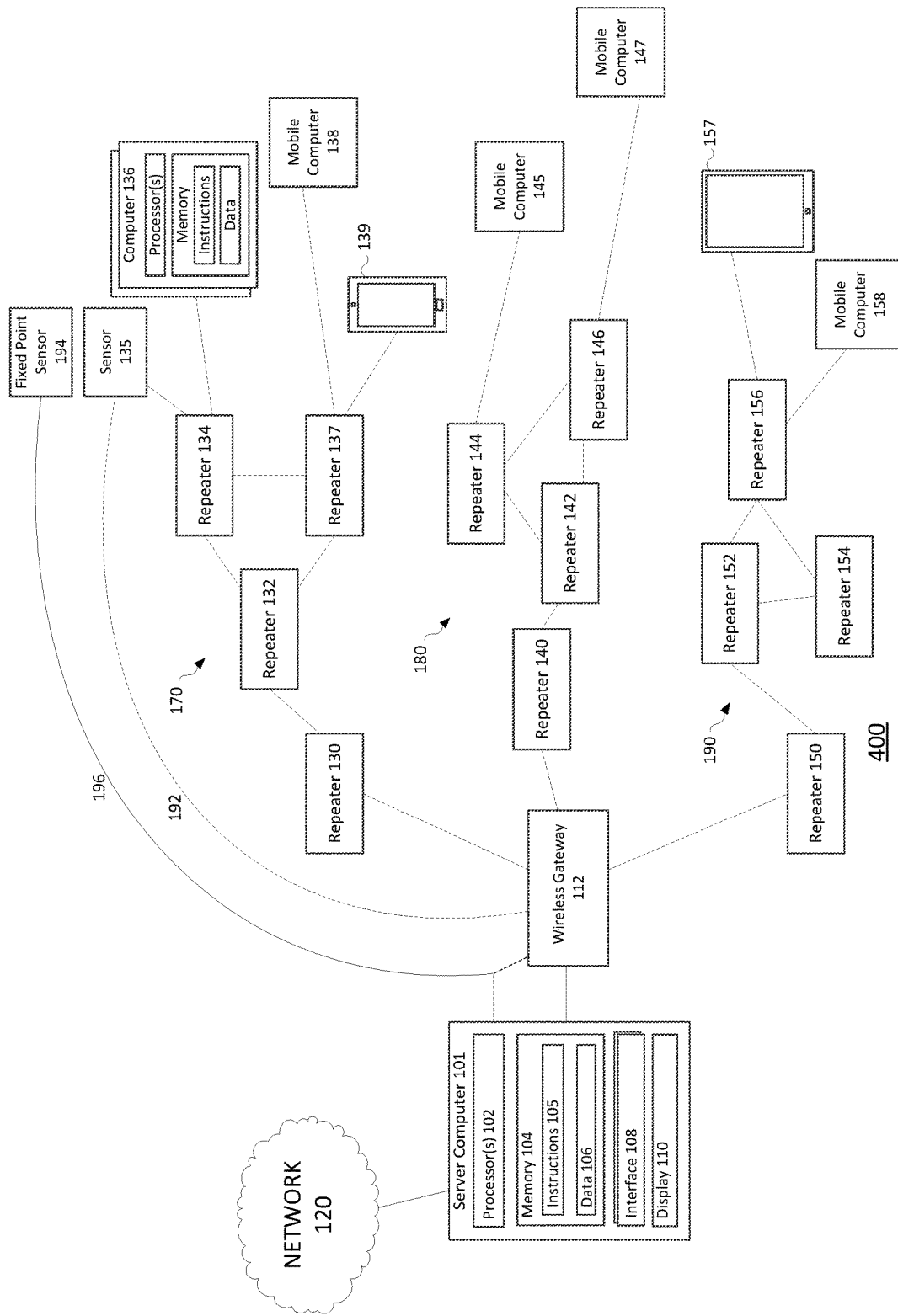
FIG. 4 illustrates a system in accordance with one or more aspects of the invention.

For example, FIG. 4 illustrates a system 400 to monitor both wired, fixed point sensors and wireless sensors. As shown, system components described in FIG. 1 can be utilized wherein the system 400 has a wireless, portable sensor 135 and an additional fixed point sensor 194. As shown, the fixed point sensor 194 can be stationary and can be wired to the data collection point, such as wireless gateway 112 or server computer 101, using wired connection 196 thus achieving improved response and interrogation. As such, in order to obtain data from the wireless sensors 135 in the system, it can be advantageous to utilize the system components 112-192 as described in FIG. 1 to monitor sensor 135 and other system components.

The systems, devices, facilities, and/or methods described herein are suitable for use in and with culturing any desired cell line including prokaryotic and/or eukaryotic cell lines. Further, in embodiments, the systems, devices, facilities, and/or methods are suitable for culturing suspension cells or anchorage-dependent (adherent) cells and are suitable for production operations configured for production of pharmaceutical and biopharmaceutical products—such as polypeptide products, nucleic acid products (for example DNA or RNA), or cells and/or viruses such as those used in cellular and/or viral therapies.

In embodiments, the cells express or produce a product, such as a recombinant therapeutic or diagnostic product. As described in more detail below, examples of products produced by cells include, but are not limited to, antibody molecules (e.g., monoclonal antibodies, bispecific antibodies), antibody mimetics (polypeptide molecules that bind specifically to antigens but that are not structurally related to antibodies such as e.g. DARPins, affibodies, adnectins, or IgNARs), fusion proteins (e.g., Fc fusion proteins, chimeric cytokines), other recombinant proteins (e.g., glycosylated proteins, enzymes, hormones), viral therapeutics (e.g., anti-cancer oncolytic viruses, viral vectors for gene therapy and viral immunotherapy), cell therapeutics (e.g., pluripotent stem cells, mesenchymal stem cells and adult stem cells), vaccines or lipid-encapsulated particles (e.g., exosomes, virus-like particles), RNA (such as e.g. siRNA) or DNA (such as e.g. plasmid DNA), antibiotics or amino acids. In embodiments, the systems, devices, facilities, and/or methods can be used for producing biosimilars.

As mentioned, in embodiments, systems, devices, facilities, and/or methods allow for the production of eukaryotic cells, e.g., mammalian cells or lower eukaryotic cells such as for example yeast cells or filamentous fungi cells, or prokaryotic cells such as Gram-positive or Gram-negative cells and/or products of the eukaryotic or prokaryotic cells, e.g., proteins, peptides, antibiotics, amino acids, nucleic acids (such as DNA or RNA), synthesised by the eukaryotic cells in a large-scale manner. Unless stated otherwise herein, the systems, devices, facilities, and/or methods can include any desired volume or production capacity including but not limited to bench-scale, pilot-scale, and full production scale capacities.

Moreover and unless stated otherwise herein, the systems, devices, facilities, and/or methods can include any suitable reactor(s) including but not limited to stirred tank, airlift, fiber, microfiber, hollow fiber, ceramic matrix, fluidized bed, fixed bed, and/or spouted bed bioreactors. As used herein, "reactor" can include a fermentor or fermentation unit, or any other reaction vessel and the term "reactor" is used interchangeably with "fermentor." For example, in some aspects, an example bioreactor unit can perform one or more, or all, of the following: feeding of nutrients and/or carbon sources, injection of suitable gas (e.g., oxygen), inlet and outlet flow of fermentation or cell culture medium, separation of gas and liquid phases, maintenance of temperature, maintenance of oxygen and CO2 levels, maintenance of pH level, agitation (e.g., stirring), and/or cleaning/sterilizing. Example reactor units, such as a fermentation unit, may contain multiple reactors within the unit, for example the unit can have 1, 2, 3, 4, 5, 10, 15, 20, 25, 30, 35, 40, 45, 50, 60, 70, 80, 90, or 100, or more bioreactors in each unit and/or a facility may contain multiple units having a single or multiple reactors within the facility. In various embodiments, the bioreactor can be suitable for batch, semi fed-batch, fed-batch, perfusion, and/or a continuous fermentation processes. Any suitable reactor diameter can be used. In embodiments, the bioreactor can have a volume between about 100 mL and about 50,000 L. Non-limiting examples include a volume of 100 mL, 250 mL, 500 mL, 750 mL, 1 liter, 2 liters, 3 liters, 4 liters, 5 liters, 6 liters, 7 liters, 8 liters, 9 liters, 10 liters, 15 liters, 20 liters, 25 liters, 30 liters, 40 liters, 50 liters, 60 liters, 70 liters, 80 liters, 90 liters, 100 liters, 150 liters, 200 liters, 250 liters, 300 liters, 350 liters, 400 liters, 450 liters, 500 liters, 550 liters, 600 liters, 650 liters, 700 liters, 750 liters, 800 liters, 850 liters, 900 liters, 950 liters, 1000 liters, 1500 liters, 2000 liters, 2500 liters, 3000 liters, 3500 liters, 4000 liters, 4500 liters, 5000 liters, 6000 liters, 7000 liters, 8000 liters, 9000 liters, 10,000 liters, 15,000 liters, 20,000 liters, and/or 50,000 liters. Additionally, suitable reactors can be multi-use, single-use, disposable, or non-disposable and can be formed of any suitable material including metal alloys such as stainless steel (e.g., 316L or any other suitable stainless steel) and Inconel, plastics, and/or glass.

In embodiments and unless stated otherwise herein, the systems, devices, facilities, and/or methods described herein can also include any suitable unit operation and/or equipment not otherwise mentioned, such as operations and/or equipment for separation, purification, and isolation of such products. Any suitable facility and environment can be used, such as traditional stick-built facilities, modular, mobile and temporary facilities, or any other suitable construction, facility, and/or layout. For example, in some embodiments modular clean-rooms can be used. Additionally and unless otherwise stated, the devices, systems, and methods described herein can be housed and/or performed in a single location or facility or alternatively be housed and/or performed at separate or multiple locations and/or facilities.

By way of non-limiting examples and without limitation, U.S. Publication Nos. 2013/0280797; 2012/0077429; 2011/0280797; 2009/0305626; and U.S. Pat. Nos. 8,298,054; 7,629,167; and 5,656,491, which are hereby incorporated by reference in their entirety, describe example facilities, equipment, and/or systems that may be suitable.

In embodiments, the cells are eukaryotic cells, e.g., mammalian cells. The mammalian cells can be for example human or rodent or bovine cell lines or cell strains. Examples of such cells, cell lines or cell strains are e.g. mouse myeloma (NSO)-cell lines, Chinese hamster ovary (CHO)-cell lines, HT1080, H9, HepG2, MCF7, MDBK Jurkat, NIH3T3, PC12, BHK (baby hamster kidney cell), VERO, SP2/0, YB2/0, Y0, C127, L cell, COS, e.g., COS1 and COS7, QC1-3, HEK-293, VERO, PER.C6, HeLA, EB1, EB2, EB3, oncolytic or hybridoma-cell lines. Preferably the mammalian cells are CHO-cell lines. In one embodiment, the cell is a CHO cell. In one embodiment, the cell is a CHO-K1 cell, a CHO-K1 SV cell, a DG44 CHO cell, a DUXB11 CHO cell, a CHOS, a CHO GS knock-out cell, a CHO FUT8 GS knock-out cell, a CHOZN, or a CHO-derived cell. The CHO GS knock-out cell (e.g., GSKO cell) is, for example, a CHO-K1 SV GS knockout cell. The CHO FUT8 knockout cell is, for example, the Potelligent® CHOK1 SV (Lonza Biologics, Inc.). Eukaryotic cells can also be avian cells, cell lines or cell strains, such as for example, EBx® cells, EB14, EB24, EB26, EB66, or EBv13.

In one embodiment, the eukaryotic cells are stem cells. The stem cells can be, for example, pluripotent stem cells, including embryonic stem cells (ESCs), adult stem cells, induced pluripotent stem cells (iPSCs), tissue specific stem cells (e.g., hematopoietic stem cells) and mesenchymal stem cells (MSCs).

In one embodiment, the cell is a differentiated form of any of the cells described herein. In one embodiment, the cell is a cell derived from any primary cell in culture.

In embodiments, the cell is a hepatocyte such as a human hepatocyte, animal hepatocyte, or a non-parenchymal cell. For example, the cell can be a plateable metabolism qualified human hepatocyte, a plateable induction qualified human hepatocyte, plateable Qualyst Transporter Certified™ human hepatocyte, suspension qualified human hepatocyte (including 10-donor and 20-donor pooled hepatocytes), human hepatic kupffer cells, human hepatic stellate cells, dog hepatocytes (including single and pooled Beagle hepatocytes), mouse hepatocytes (including CD-1 and C57BI/6 hepatocytes), rat hepatocytes (including Sprague-Dawley, Wistar Han, and Wistar hepatocytes), monkey hepatocytes (including Cynomolgus or Rhesus monkey hepatocytes), cat hepatocytes (including Domestic Shorthair hepatocytes), and rabbit hepatocytes (including New Zealand White hepatocytes). Example hepatocytes are commercially available from Triangle Research Labs, LLC, 6 Davis Drive Research Triangle Park, N.C., USA 27709.

In one embodiment, the eukaryotic cell is a lower eukaryotic cell such as e.g. a yeast cell (e.g., *Pichia* genus (e.g. *Pichia pastoris, Pichia methanolica, Pichia kluyveri,* and *Pichia angusta*), *Komagataella* genus (e.g. *Komagataella pastoris, Komagataella pseudopastoris* or *Komagataella phaffii*), *Saccharomyces* genus (e.g. *Saccharomyces cerevisae, cerevisiae, Saccharomyces kluyveri, Saccharomyces uvarum*), *Kluyveromyces* genus (e.g. *Kluyveromyces lactis, Kluyveromyces marxianus*), the *Candida* genus (e.g. *Candida utilis, Candida cacaoi, Candida boidinii*), the *Geotrichum* genus (e.g. *Geotrichum fermentans*), *Hansenula polymorpha, Yarrowia lipolytica,* or *Schizosaccharomyces pombe*. Preferred is the species *Pichia pastoris*. Examples for *Pichia pastoris* strains are X33, GS115, KM71, KM71H; and CBS7435.

In one embodiment, the eukaryotic cell is a fungal cell (e.g. *Aspergillus* (such as *A. niger, A. fumigatus, A. orzyae, A. nidula*), *Acremonium* (such as *A. thermophilum*), *Chaetomium* (such as *C. thermophilum*), *Chrysosporium* (such as *C. thermophile*), *Cordyceps* (such as *C. militaris*), *Corynascus*, *Ctenomyces*, *Fusarium* (such as *F. oxysporum*), *Glomerella* (such as *G. graminicola*), *Hypocrea* (such as *H. jecorina*), *Magnaporthe* (such as *M. orzyae*), *Myceliophthora* (such as *M. thermophile*), *Nectria* (such as *N.* heamatococca), *Neurospora* (such as *N. crassa*), *Penicillium, Sporotrichum* (such as *S. thermophile*), *Thielavia* (such as *T. terrestris, T. heterothallica*), *Trichoderma* (such as *T. reesei*), or *Verticillium* (such as *V. dahlia*)).

In one embodiment, the eukaryotic cell is an insect cell (e.g., Sf9, Mimic™ Sf9, Sf21, High Five™ (BT1-TN-5B1-4), or BT1-Ea88 cells), an algae cell (e.g., of the genus *Amphora, Bacillariophyceae, Dunaliella, Chlorella, Chlamydomonas, Cyanophyta* (cyanobacteria), *Nannochloropsis, Spirulina,* or *Ochromonas*), or a plant cell (e.g., cells from monocotyledonous plants (e.g., maize, rice, wheat, or *Setaria*), or from a dicotyledonous plants (e.g., cassava, potato, soybean, tomato, tobacco, alfalfa, *Physcomitrella patens* or *Arabidopsis*).

In one embodiment, the cell is a bacterial or prokaryotic cell.

In embodiments, the prokaryotic cell is a Gram-positive cells such as *Bacillus, Streptomyces Streptococcus, Staphylococcus* or *Lactobacillus. Bacillus* that can be used is, e.g. the *B. subtilis, B. amyloliquefaciens, B. licheniformis, B. natto,* or *B. megaterium*. In embodiments, the cell is *B. subtilis*, such as *B. subtilis* 3NA and *B. subtilis* 168. *Bacillus* is obtainable from, e.g., the *Bacillus* Genetic Stock Center, Biological Sciences 556, 484 West 12$^{th}$ Avenue, Columbus Ohio 43210-1214.

In one embodiment, the prokaryotic cell is a Gram-negative cell, such as *Salmonella* spp. or *Escherichia coli*, such as e.g., TG1, TG2, W3110, DH1, DHB4, DH5a, HMS 174, HMS174 (DE3), NM533, C600, HB101, JM109, MC4100, XL1-Blue and Origami, as well as those derived from *E. coli* B-strains, such as for example BL-21 or BL21 (DE3), all of which are commercially available.

Suitable host cells are commercially available, for example, from culture collections such as the DSMZ (Deutsche Sammlung von Mikroorganismen and Zellkulturen GmbH, Braunschweig, Germany) or the American Type Culture Collection (ATCC).

In embodiments, the cultured cells are used to produce proteins e.g., antibodies, e.g., monoclonal antibodies, and/or recombinant proteins, for therapeutic use. In embodiments, the cultured cells produce peptides, amino acids, fatty acids or other useful biochemical intermediates or metabolites. For example, in embodiments, molecules having a molecular weight of about 4000 daltons to greater than about 140,000 daltons can be produced. In embodiments, these molecules can have a range of complexity and can include posttranslational modifications including glycosylation.

In embodiments, the protein is, e.g., BOTOX, Myobloc, Neurobloc, Dysport (or other serotypes of botulinum neurotoxins), alglucosidase alpha, daptomycin, YH-16, choriogonadotropin alpha, filgrastim, cetrorelix, interleukin-2, aldesleukin, teceleulin, denileukin diftitox, interferon alpha-n3 (injection), interferon alpha-n1, DL-8234, interferon, Suntory (gamma-1a), interferon gamma, thymosin alpha 1, tasonermin, DigiFab, ViperaTAb, EchiTAb, CroFab, nesiritide, abatacept, alefacept, Rebif, eptoterminalfa, teriparatide (osteoporosis), calcitonin injectable (bone disease), calcitonin (nasal, osteoporosis), etanercept, hemoglobin glutamer 250 (bovine), drotrecogin alpha, collagenase, carperitide, recombinant human epidermal growth factor (topical gel, wound healing), DWP401, darbepoetin alpha, epoetin omega, epoetin beta, epoetin alpha, desirudin, lepirudin, bivalirudin, nonacog alpha, Mononine, eptacog alpha (activated), recombinant Factor VIII+VWF, Recombinate, recombinant Factor VIII, Factor VIII (recombinant), Alphnmate, octocog alpha, Factor VIII, palifermin, Indikinase, tenecteplase, alteplase, pamiteplase, reteplase, nateplase, monteplase, follitropin alpha, rFSH, hpFSH, micafungin, pegfilgrastim, lenograstim, nartograstim, sermorelin, glucagon, exenatide, pramlintide, iniglucerase, galsulfase, Leucotropin, molgramostirn, triptorelin acetate, histrelin (subcutaneous implant, Hydron), deslorelin, histrelin, nafarelin, leuprolide sustained release depot (ATRIGEL), leuprolide implant (DUROS), goserelin, Eutropin, KP-102 program, somatropin, mecasermin (growth failure), enlfavirtide, Org-33408, insulin glargine, insulin glulisine, insulin (inhaled), insulin lispro, insulin deternir, insulin (buccal, RapidMist), mecasermin rinfabate, anakinra, celmoleukin, 99 mTc-apcitide injection, myelopid, Betaseron, glatiramer acetate, Gepon, sargramostim, oprelvekin, human leukocyte-derived alpha interferons, Bilive, insulin (recombinant), recombinant human insulin, insulin aspart, mecasenin, Roferon-A, interferon-alpha 2, Alfaferone, interferon alfacon-1, interferon alpha, Avonex' recombinant human luteinizing hormone, dornase alpha, trafermin, ziconotide, taltirelin, diboterminalfa, atosiban, becaplermin, eptifibatide, Zemaira, CTC-111, Shanvac-B, HPV vaccine (quadrivalent), octreotide, lanreotide, ancestirn, agalsidase beta, agalsidase alpha, laronidase, prezatide copper acetate (topical gel), rasburicase, ranibizumab, Actimmune, PEG-Intron, Tricomin, recombinant house dust mite allergy desensitization injection, recombinant human parathyroid hormone (PTH) 1-84 (sc, osteoporosis), epoetin delta, transgenic antithrombin III, Granditropin, Vitrase, recombinant insulin, interferon-alpha (oral lozenge), GEM-21S, vapreotide, idursulfase, omnapatrilat, recombinant serum albumin, certolizumab pegol, glucarpidase, human recombinant C1 esterase inhibitor (angioedema), lanoteplase, recombinant human growth hormone, enfuvirtide (needle-free injection, Biojector 2000), VGV-1, interferon (alpha), lucinactant, aviptadil (inhaled, pulmonary disease), icatibant, ecallantide, omiganan, Aurograb, pexigananacetate, ADI-PEG-20, LDI-200, degarelix, cintredelinbesudotox, Favld, MDX-1379, ISAtx-247, liraglutide, teriparatide (osteoporosis), tifacogin, AA4500, T4N5 liposome lotion, catumaxomab, DWP413, ART-123, Chrysalin, desmoteplase, amediplase, corifollitropinalpha, TH-9507, teduglutide, Diamyd, DWP-412, growth hormone (sustained release injection), recombinant G-CSF, insulin (inhaled, AIR), insulin (inhaled, Technosphere), insulin (inhaled, AERx), RGN-303, DiaPep277, interferon beta (hepatitis C viral infection (HCV)), interferon alpha-n3 (oral), belatacept, transdermal insulin patches, AMG-531, MBP-8298, Xerecept, opebacan, AIDS-VAX, GV-1001, LymphoScan, ranpirnase, Lipoxysan, lusupultide, MP52 (beta-tricalciumphosphate carrier, bone regeneration), melanoma vaccine, sipuleucel-T, CTP-37, Insegia, vitespen, human thrombin (frozen, surgical bleeding), thrombin, TransMID, alfimeprase, Puricase, terlipressin (intravenous, hepatorenal syndrome), EUR-1008M, recombinant FGF-I (injectable, vascular disease), BDM-E, rotigaptide, ETC-216, P-113, MBI-594AN, duramycin (inhaled, cystic fibrosis), SCV-07, OPI-45, Endostatin, Angiostatin, ABT-510, Bowman Birk Inhibitor Concentrate, XMP-629, 99 mTc-Hynic-Annexin V, kahalalide F, CTCE-9908, teverelix (extended release), ozarelix, rornidepsin, BAY-504798, interleukin4, PRX-321, Pepscan, iboctadekin, rhlactoferrin, TRU-015, IL-21, ATN-161, cilengitide, Albuferon, Biphasix, IRX-2, omega interferon, PCK-3145, CAP-232, pasireotide, huN901-DMI, ovarian cancer immunotherapeutic vaccine, SB-249553, Oncovax-CL, OncoVax-P, BLP-25, CerVax-16, multi-epitope peptide melanoma vaccine (MART-1, gp100, tyrosinase), nemifitide, rAAT (inhaled), rAAT (dermatological), CGRP (inhaled, asthma), pegsunercept, thymosinbeta4, plitidepsin, GTP-200, ramoplanin, GRASPA, OBI-1, AC-100, salmon calcitonin (oral, eligen), calcitonin (oral, osteoporosis), examorelin, capromorelin, Cardeva, velafermin, 131I-TM-601, KK-220, T-10, ularitide, depelestat, hematide, Chrysalin (topical), rNAPc2, recombinant Factor V111 (PEGylated liposomal), bFGF, PEGylated recombinant staphylokinase variant, V-10153, SonoLysis Prolyse, NeuroVax, CZEN-002, islet cell neogenesis therapy, rGLP-1, BIM-51077, LY-548806, exenatide (controlled release, Medisorb), AVE-0010, GA-GCB, avorelin, ACM-9604, linaclotid eacetate, CETi-1, Hemospan, VAL (injectable), fast-acting insulin (injectable, Viadel), intranasal insulin, insulin (inhaled), insulin (oral, eligen), recombinant methionyl human leptin, pitrakinra subcutancous injection, eczema), pitrakinra (inhaled dry powder, asthma), Multikine, RG-1068, MM-093, NBI-6024, AT-001, PI-0824, Org-39141, Cpn10 (autoimmune diseases/inflammation), talactoferrin (topical), rEV-131 (ophthalmic), rEV-131 (respiratory disease), oral recombinant human insulin (diabetes), RPI-78M, oprelvekin (oral), CYT-99007 CTLA4-Ig, DTY-001, valategrast, interferon alpha-n3 (topical), IRX-3, RDP-58, Tauferon, bile salt stimulated lipase, Merispase, alaline phosphatase, EP-2104R, Melanotan-II, bremelanotide, ATL-104, recombinant human microplasmin, AX-200, SEMAX, ACV-1, Xen-2174, CJC-1008, dynorphin A, SI-6603, LAB GHRH, AER-002, BGC-728, malaria vaccine (virosomes, PeviPRO), ALTU-135, parvovirus B19 vaccine, influenza vaccine (recombinant neuraminidase), malaria/HBV vaccine, anthrax vaccine, Vacc-5q, Vacc-4x, HIV vaccine (oral), HPV vaccine, Tat Toxoid, YSPSL, CHS-13340, PTH(1-34) liposomal cream (Novasome), Ostabolin-C, PTH analog (topical, psoriasis), MBRI-93.02, MTB72F vaccine (tuberculosis), MVA-Ag85A vaccine (tuberculosis), FARA04, BA-210, recombinant plague FIV vaccine, AG-702, OxSODrol, rBetV1, Der-p1/Der-p2/Der-p7 allergen-targeting vaccine (dust mite allergy), PR1 peptide antigen (leukemia), mutant ras vaccine, HPV-16 E7 lipopeptide vaccine, labyrinthin vaccine (adenocarcinoma), CML vaccine, WT1-peptide vaccine (cancer), IDD-5, CDX-110, Pentrys, Norelin, CytoFab, P-9808, VT-111, icrocaptide, telbermin (dermatological, diabetic foot ulcer), rupintrivir, reticulose, rGRF, HA, alpha-galactosidase A, ACE-011, ALTU-140, CGX-1160, angiotensin therapeutic vaccine, D-4F, ETC-642, APP-018, rhMBL, SCV-07 (oral, tuberculosis), DRF-7295, ABT-828, ErbB2-specific immunotoxin (anticancer), DT3 SSIL-3, TST-10088, PRO-1762, Combotox, cholecystokinin-B/gastrin-receptor binding peptides, 111In-hEGF, AE-37, trasnizumab-DM1, Antagonist G, IL-12 (recombinant), PM-02734, IMP-321, rhIGF-BP3, BLX-883, CUV-1647 (topical), L-19 based radioimmunotherapeutics (cancer), Re-188-P-2045, AMG-386, DC/1540/KLH vaccine (cancer), VX-001, AVE-9633, AC-9301, NY-ESO-1 vaccine (peptides), NA17.A2 peptides, melanoma vaccine (pulsed antigen therapeutic), prostate cancer vaccine, CBP-501, recombinant human lactoferrin (dry eye), FX-06, AP-214, WAP-8294A (injectable), ACP-HIP, SUN-11031, peptide YY [3-36] (obesity, intranasal), FGLL, atacicept, BR3-Fc, BN-003, BA-058, human parathyroid hormone 1-34 (nasal, osteoporosis), F-18-CCR1, AT-1100 (celiac disease/diabetes), JPD-003, PTH(7-34) liposomal cream (Novasome), duramycin (ophthalmic, dry eye), CAB-2, CTCE-0214, GlycoPEGylated erythropoietin, EPO-Fc, CNTO-528, AMG-114, JR-013, Factor XIII, aminocandin, PN-951, 716155, SUN-E7001, TH-0318, BAY-73-7977, teverelix (immediate release), EP-51216, hGH (controlled release, Biosphere), OGP-I, sifuvirtide, TV4710, ALG-889, Org-41259, rhCC10, F-991, thymopentin (pulmonary diseases), r(m)CRP, hepatoselective insulin, subalin, L19-IL-2 fusion protein, elafin, NMK-150, ALTU-139, EN-122004, rhTPO, thrombopoietin receptor agonist (thrombocytopenic disorders), AL-108, AL-208, nerve growth factor antagonists (pain), SLV-317, CGX-1007, INNO-105, oral teriparatide (eligen), GEM-OS1, AC-162352, PRX-302, LFn-p24 fusion vaccine (Therapore), EP-1043, *S pneumoniae* pediatric vaccine, malaria vaccine, *Neisseria meningitidis* Group B vaccine, neonatal group B streptococcal vaccine, anthrax vaccine, HCV vaccine (gpE1+gpE2+MF-59), otitis media therapy, HCV vaccine (core antigen+ISCOMATRIX), hPTH(1-34) (transdermal, ViaDerm), 768974, SYN-101, PGN-0052, aviscumnine, BIM-23190, tuberculosis vaccine, multi-epitope tyrosinase peptide, cancer vaccine, enkastim, APC-8024, GI-5005, ACC-001, TTS-CD3, vascular-targeted TNF (solid tumors), desmopressin (buccal controlled-release), onercept, and TP-9201.

In some embodiments, the polypeptide is adalimumab (HUMIRA), infliximab (REMICADE™), rituximab (RITUXAN™/MAB THERA™) etanercept (ENBREL™), bevacizumab (AVASTIN™), trastuzumab (HERCEPTIN™), pegrilgrastim (NEULASTA™), or any other suitable polypeptide including biosimilars and biobetters.

Other suitable polypeptides are those listed below and in Table 1 of US2016/0097074:

TABLE 1

| Protein Product | Reference Listed Drug |
|---|---|
| interferon gamma-1b | Actimmune ® |
| alteplase; tissue plasminogen activator | Activase ® /Cathflo ® |
| Recombinant antihemophilic factor | Advate |
| human albumin | Albutein ® |
| Laronidase | Aldurazyme ® |
| Interferon alfa-N3, human leukocyte derived | Alferon N ® |
| human antihemophilic factor | Alphanate ® |
| virus-filtered human coagulation factor IX | AlphaNine ® SD |
| Alefacept; recombinant, dimeric fusion protein LFA3-Ig | Amevive ® |
| Bivalirudin | Angiomax ® |
| darbepoetin alfa | Aranesp ™ |
| Bevacizumab | Avastin ™ |
| interferon beta-1a; recombinant | Avonex ® |
| coagulation factor IX | BeneFix ™ |
| Interferon beta-1b | Betaseron ® |
| Tositumomab | BEXXAR ® |
| antihemophilic factor | Bioclate ™ |
| human growth hormone | BioTropin ™ |
| botulinum toxin type A | BOTOX ® |
| Alemtuzumab | Campath ® |
| acritumomab; technetium-99 labeled | CEA-Scan ® |
| alglucerase; modified form of beta-glucocerebrosidase | Ceredase ® |
| imiglucerase; recombinant form of beta-glucocerebrosidase | Cerezyme ® |
| crotalidae polyvalent immune Fab, ovine | CroFab ™ |
| digoxin immune fab [ovine] | DigiFab ™ |
| Rasburicase | Elitek ® |
| Etanercept | ENBREL ® |
| epoietin alfa | Epogen ® |
| Cetuximab | Erbitux ™ |
| algasidase beta | Fabrazyme ® |
| Urofollitropin | Fertinex ™ |
| follitropin beta | Follistim ™ |
| Teriparatide | FORTEO ® |
| human somatropin | GenoTropin ® |
| Glucagon | GlucaGen ® |
| follitropin alfa | Gonal-F ® |
| antihemophilic factor | Helixate ® |
| Antihemophilic Factor; Factor XIII | HEMOFIL |
| adefovir dipivoxil | Hepsera ™ |

TABLE 1-continued

| Protein Product | Reference Listed Drug |
|---|---|
| Trastuzumab | Herceptin ® |
| Insulin | Humalog ® |
| antihemophilic factor/von Willebrand factor complex-human | Humate-P ® |
| Somatotropin | Humatrope ® |
| Adalimumab | HUMIRA ™ |
| human insulin | Humulin ® |
| recombinant human hyaluronidase | Hylenex ™ |
| interferon alfacon-1 | Infergen ® |
| eptifibatide | Integrilin ™ |
| alpha-interferon | Intron A ® |
| Palifermin | Kepivance |
| Anakinra | Kineret ™ |
| antihemophilic factor | Kogenate ® FS |
| insulin glargine | Lantus ® |
| granulocyte macrophage colony-stimulating factor | Leukine ® /Leukine ® Liquid |
| lutropin alfa for injection | Luveris |
| OspA lipoprotein | LYMErix ™ |
| Ranibizumab | LUCENTIS ® |
| gemtuzumab ozogamicin | Mylotarg ™ |
| Galsulfase | Naglazyme ™ |
| Nesiritide | Natrecor ® |
| Pegfilgrastim | Neulasta ™ |
| Oprelvekin | Neumega ® |
| Filgrastim | Neupogen ® |
| Fanolesomab | NeutroSpec ™ (formerly LeuTech ® ) |
| somatropin [rDNA] | Norditropin ® /Norditropin Nordiflex ® |
| Mitoxantrone | Novantrone ® |
| insulin; zinc suspension; | Novolin L ® |
| insulin; isophane suspension | Novolin N ® |
| insulin, regular; | Novolin R ® |
| Insulin | Novolin ® |
| coagulation factor VIIa | NovoSeven ® |
| Somatropin | Nutropin ® |
| immunoglobulin intravenous | Octagam ® |
| PEG-L-asparaginase | Oncaspar ® |
| abatacept, fully human soluable fusion protein | Orencia ™ |
| muromomab-CD3 | Orthoclone OKT3 ® |
| high-molecular weight hyaluronan | Orthovisc ® |
| human chorionic gonadotropin | Ovidrel ® |
| live attenuated Bacillus Calmette-Guerin | Pacis ® |
| peginterferon alfa-2a | Pegasys ® |

TABLE 1-continued

| Protein Product | Reference Listed Drug |
|---|---|
| pegylated version of interferon alfa-2b | PEG-Intron ™ |
| Abarelix (injectable suspension); gonadotropin-releasing hormone antagonist | Plenaxis ™ |
| epoietin alfa | Procrit ® |
| Aldesleukin | Proleukin, IL-2 ® |
| Somatrem | Protropin ® |
| dornase alfa | Pulmozyme ® |
| Efalizumab; selective, reversible T-cell blocker | RAPTIVA ™ |
| combination of ribavirin and alpha interferon | Rebetron ™ |
| Interferon beta 1a | Rebif ® |
| antihemophilic factor | Recombinate ® rAHF/ |
| antihemophilic factor | ReFacto ® |
| Lepirudin | Refludan ® |
| Infliximab | REMICADE ® |
| Abciximab | ReoPro ™ |
| Reteplase | Retavase ™ |
| Rituxima | Rituxan ™ |
| interferon alfa-2$^a$ | Roferon-A ® |
| Somatropin | Saizen ® |
| synthetic porcine secretin | SecreFlo ™ |
| Basiliximab | Simulect ® |
| Eculizumab | SOLARIS (R) |
| Pegvisomant | SOMAVERT ® |
| Palivizumab; recombinantly produced, humanized mAb | Synagis ™ |
| thyrotropin alfa | Thyrogen ® |
| Tenecteplase | TNKase ™ |
| Natalizumab | TYSABRI ® |
| human immune globulin intravenous 5% and 10% solutions | Venoglobulin-S ® |
| interferon alfa-n1, lymphoblastoid | Wellferon ® |
| drotrecogin alfa | Xigris ™ |
| Omalizumab; recombinant DNA-derived humanized monoclonal antibody targeting immunoglobulin-E | Xolair ® |
| Daclizumab | Zenapax ® |
| ibritumomab tiuxetan | Zevalin ™ |
| Somatotropin | Zorbtive ™ (Serostim ®) |

In embodiments, the polypeptide is a hormone, blood clotting/coagulation factor, cytokine/growth factor, antibody molecule, fusion protein, protein vaccine, or peptide as shown in Table 2.

TABLE 2

Exemplary Products

| Therapeutic Product type | Product | Trade Name |
|---|---|---|
| Hormone | Erythropoietin, Epoein-α | Epogen, Procrit |
| | Darbepoetin-α | Aranesp |
| | Growth hormone (GH), somatotropin | Genotropin , Humatrope, Norditropin, NovIVitropin, Nutropin, Omnitrope, Protropin, Siazen, Serostim, Valtropin |
| | Human follicle-stimulating hormone (FSH) | Gonal-F, Follistim |
| | Human chorionic gonadotropin | Ovidrel |
| | Lutropin-α | Luveris |
| | Glucagon | GlcaGen |
| | Growth hormone releasing hormone (GHRH) | Geref |
| | Secretin | ChiRhoStim (human peptide), SecreFlo (porcine peptide) |
| | Thyroid stimulating hormone (TSH), thyrotropin | Thyrogen |
| Blood Clotting/Coagulation Factors | Factor VIIa | NovoSeven |
| | Factor VIII | Bioclate, Helixate, Kogenate, Recombinate, ReFacto |
| | Factor IX | |
| | Antithrombin III (AT-III) | Benefix |

TABLE 2-continued

Exemplary Products

| Therapeutic Product type | Product | Trade Name |
|---|---|---|
| | Protein C concentrate | Thrombate III |
| | | Ceprotin |
| Cytokine/Growth factor | Type I alpha-interferon | Infergen |
| | Interferon-αn3 (IFNαn3) | Alferon N |
| | Interferon-β1a (rIFN-β) | Avonex, Rebif |
| | Interferon-β1b (rIFN-β) | Betaseron |
| | Interferon-Δ1b (IFN γ) | Actimmune |
| | Aldesleukin (interleukin 2(IL2), epidermal theymocyte activating factor; ETAF | Proleukin |
| | Palifermin (keratinocyte growth factor; KGF) | Kepivance |
| | Becaplemin (platelet-derived growth factor; PDGF) | Regranex |
| | Anakinra (recombinant IL1 antagonist) | Anril, Kineret |
| Antibody molecules | Bevacizumab (VEGFA mAb) | Avastin |
| | Cetuximab (EGFR mAb) | Erbitux |
| | Panitumumab (EGFR mAb) | Vectibix |
| | Alemtuzumab (CD52 mAb) | Campath |
| | Rituximab (CD20 chimeric Ab) | Rituxan |
| | Trastuzumab (HER2/Neu mAb) | Herceptin |
| | Abatacept (CTLA Ab/Fc fusion) | Orencia |
| | Adalimumab (TNFβ mAb) | Humira |
| | Etanercept (TNF receptor/Fc fusion) | Enbrel |
| | Infliximab (TNFβ chimeric mAb) | Remicade |
| | Alefacept (CD2 fusion protein) | Amevive |
| | Efalizumab (CD11a mAb) | Raptiva |
| | Natalizumab (integrin β4 subunit mAb) | Tysabri |
| | Eculizumab (C5mAb) | Soliris |
| | Muromonab-CD3 | Orthoclone, OKT3 |
| Other: Fusion proteins/Protein vaccines/Peptides | Insulin | Humulin, Novolin |
| | Hepatitis B surface antigen (HBsAg) | Engerix, Recombivax HB |
| | HPV vaccine | Gardasil |
| | OspA | LYMErix |
| | Anti-Rhesus(Rh) immunoglobulin G | Rhophylac |
| | Enfuvirtide | Fuzeon |
| | Spider silk, e.g., fibrion | QMONOS |

In embodiments, the protein is multispecific protein, e.g., a bispecific antibody as shown in Table 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure use terminology and acronyms that may not be familiar to the layperson, those skilled in the art will be familiar with the terminology and acronyms used herein.

What is claimed is:

1. A system for monitoring data output from a wireless sensor, the system comprising:
   a wireless gateway;
   an amplifier coupled to the wireless gateway;
   a first antenna coupled to the amplifier;
   a second antenna coupled to the amplifier; and
   a wireless sensor, and
   wherein the wireless gateway is a component of a mesh network,
   wherein the wireless sensor is configured to measure one or more properties of a material,
   wherein the material and the wireless sensor are transported together from a first location to a second location different from the first location, and
   wherein the wireless sensor maintains a direct and continuous connection with the wireless gateway when the wireless sensor is transported.

2. The system of claim 1, wherein the first antenna is located on a first level of a building, and wherein the second antenna is located on a second level of the building, the second level being at an elevation higher than the first level.

3. The system of claim 1, further comprising a first splitter, a second splitter, and a third splitter.

4. The system of claim 3, wherein the first splitter is coupled to the amplifier, the second splitter is coupled to the first splitter and the third splitter is coupled to the first splitter.

5. The system of claim 4, wherein the first antenna is coupled to the second splitter and the second antenna is coupled to the third splitter.

6. The system of claim 5, further comprising a third antenna coupled to the second splitter and a fourth antenna coupled to the second splitter.

7. The system of claim 5, further comprising a fifth antenna coupled to the third splitter and a sixth antenna coupled to the third splitter.

8. The system of claim 1, wherein the amplifier is a fixed amplifier or a variable amplifier configured to adjust amplification of the amplifier.

9. The system of claim 2, wherein the first antenna is located at a first elevator lobby on the first level of the building and the second antenna is located at a second elevator lobby on the second level of the building.

10. The system of claim 6, wherein the third antenna is located in a first room on a first level of a building and the fourth antenna is located at a position between the first room and a first elevator lobby on the first level of the building.

11. The system of claim 7, wherein the fifth antenna is located in a second room on a second level of a building and the sixth antenna is located at a position between the second room and a second elevator lobby on the second level of the building.

12. The system of claim 1, wherein the wireless sensor is a wireless temperature sensor configured to one or more of: (i) measure a temperature of the material, the material being a cryopreserved material, the one or more properties of the cryopreserved material including the temperature (ii) display data associated with the temperature of the cryopreserved material, and (iii) transmit the data.

13. The system of claim 12, wherein the wireless gateway is configured to receive the data transmitted from the wireless temperature sensor at predefined time intervals.

14. The system of claim 13, wherein the predefined time intervals is approximately every 16 seconds.

15. The system of claim 12, wherein the first location is a first room of a building and the second location is a second room of the building, the cryopreserved material and the wireless temperature sensor are transported from the first room to the second room via an elevator from a first elevator lobby to a second elevator lobby.

16. The system of claim 13, wherein at least one processor is configured to determine whether the wireless gateway has received the data from the wireless temperature sensor at or within the predefined time intervals.

17. An apparatus for monitoring data output from a wireless sensor, the apparatus comprising:

a wireless gateway;
an amplifier coupled to the wireless gateway;
a splitter coupled to the amplifier;
a first antenna coupled to the splitter; and
a second antenna coupled to the splitter,
wherein the first antenna and the second antenna are configured to receive a signal from a wireless sensor, and
wherein the wireless gateway is a component of an existing mesh network,
wherein the wireless sensor is configured to measure one or more properties of a material,
wherein the material and the wireless sensor are transported together from a first location to a second location different from the first location, and
wherein the wireless sensor maintains a direct and continuous connection with the wireless gateway when the wireless sensor is transported.

18. The apparatus of claim 17, wherein the first antenna is located on a first level of a building, and wherein the second antenna is located on a second level of the building, the second level being at an elevation higher than the first level.

19. The apparatus of claim 18, wherein the first antenna is coupled to splitter via a first coaxial cable and the second antenna is coupled to the splitter via a second coaxial cable.

20. A method for monitoring data output from a wireless sensor, the method comprising:

providing a wireless gateway;
coupling an amplifier to the wireless gateway;
coupling a splitter to the amplifier;
coupling a first antenna to the splitter; and
coupling a second antenna to the splitter,
wherein the first antenna and the second antenna are configured to receive a signal from a wireless sensor, and
wherein the wireless gateway is a component of an existing mesh network,
wherein the wireless sensor is configured to measure one or more properties of a material,
wherein the material and the wireless sensor are transported together from a first location to a second location different from the first location, and
wherein the wireless sensor maintains a direct and continuous connection with the wireless gateway when the wireless sensor is transported.

21. The method of claim 20, further comprising placing the first antenna on a first level of a building and placing the second antenna on a second level of the building, wherein the second level being at an elevation higher than the first level.

22. The system of claim 1, wherein the system further comprises a fixed point sensor wired to a data collection point of the system.

* * * * *

UNITED STATES PATENT AND TRADEMARK OFFICE
CERTIFICATE OF CORRECTION

PATENT NO. : 10,244,406 B2  
APPLICATION NO. : 15/452393  
DATED : March 26, 2019  
INVENTOR(S) : Rex Polley et al.

Page 1 of 1

It is certified that error appears in the above-identified patent and that said Letters Patent is hereby corrected as shown below:

On the Title Page

Column 1, item (71) should read:  
(71) Applicant: Lonza Ltd., Visp (CH)

Column 1, item (73) should read:  
(73) Assignee: Lonza Ltd., Visp (CH)

Signed and Sealed this  
Thirtieth Day of July, 2019

Andrei Iancu  
*Director of the United States Patent and Trademark Office*